(12) United States Patent
Pengwu

(10) Patent No.: US 7,027,622 B2
(45) Date of Patent: Apr. 11, 2006

(54) METHOD FOR LOCATING FACE LANDMARKS IN AN IMAGE

(75) Inventor: Chung-Mou Pengwu, Junghe (TW)

(73) Assignee: Industrial Technology Research Institute, Hsinchu (TW)

( * ) Notice: Subject to any disclaimer, the term of this patent is extended or adjusted under 35 U.S.C. 154(b) by 723 days.

(21) Appl. No.: 10/284,151

(22) Filed: Oct. 31, 2002

(65) Prior Publication Data

US 2003/0190060 A1    Oct. 9, 2003

(30) Foreign Application Priority Data

Apr. 9, 2002   (TW) .............................. 91107106 A

(51) Int. Cl.
*G06K 9/00* (2006.01)
*G06K 9/62* (2006.01)
*G06K 9/68* (2006.01)

(52) U.S. Cl. .................. 382/118; 382/209; 382/218

(58) Field of Classification Search ................ 382/118, 382/209, 218
See application file for complete search history.

(56) References Cited

U.S. PATENT DOCUMENTS

| | | | | |
|---|---|---|---|---|
| 4,718,093 A | * | 1/1988 | Brown | ........................ 704/243 |
| 4,982,438 A | * | 1/1991 | Usami et al. | ................ 382/154 |
| 2004/0088722 A1 | * | 5/2004 | Peker | ........................... 725/19 |

OTHER PUBLICATIONS

F. Porikli. Inter-camera color calibration by correlation model function. In IEEE International Conference on Image Processing, vol. 2, pp. 133-136, 2003.*

Onno Wink, Wiro J. Niessen, Max A. Viergever. "Minimum Cost Path Determination Using a Simple Heuristic Function," icpr, p. 7010, 15th International Conference on Pattern Recognition (ICPR'00)—vol. 3, 2000.*

* cited by examiner

*Primary Examiner*—Joseph Mancuso
*Assistant Examiner*—Hadi Akhavannik
(74) *Attorney, Agent, or Firm*—Bacon & Thomas, PLLC

(57) ABSTRACT

A method for locating face landmarks (e.g., eyes, nose, etc.) from an image is provided. The method comprises preprocessing an input image for alignment; comparing the aligned input image with a reference image located with face landmarks; calculating distances of pixels and pixel rows of the images; finding a correspondence between pixel rows of the reference image and that of the input image; and using the correspondence and the face landmarks of the reference image to find face landmarks of the aligned input image.

11 Claims, 9 Drawing Sheets

METHOD FOR LOCATING FACE LANDMARKS IN AN IMAGE

BACKGROUND OF THE INVENTION

1. Field of the Invention

The present invention relates to the field of image recognition and, more particularly, to a method for locating face landmarks of an image by using dynamic programming.

2. Description of Related Art

Conventionally, local features are widely utilized for recognition in order to find a location of the face appearing in an image. As known that local features of the face comprise eyes, nose, lips, cheeks, forehead, etc. One or more of such local features of the image are compared with fetched image in order to confirm whether they are the same. As such, an exact representation of each local feature of the face is essential to a successful subsequent recognition of a portion in an image (e.g., the face).

Typically, there are two approaches for finding face landmarks (e.g., eyes, nose, and lips) from an image of the face. The first one is to use image processing, such as filtering, morphological operation, or threshold operation, to select a number of candidate portions from the face landmarks, and then confirm a portion or all of the candidates as features. The second one employs a graph matching method to represent a face model by a featured graph, wherein nodes are used to represent feature locations, and edges between the nodes are used to represent relative locations of the features. The feature value of each node is obtained by performing the image processing. The model is then shifted around the image, so as to locate the face landmarks by image matching.

An image processing method is disclosed in U.S. Pat. No. 5,805,475 which first calculates a threshold by a heuristic method or statistics. The threshold is critical to a successful recognition. In the patent, each of the morphological or threshold operation involves a number of threshold determinations. In the case of utilizing the heuristic method, the threshold is required to be amended in response to variability of images as observed. As a result, the implementation is difficult and an efficient recognition of face landmarks in the image is made impossible.

A graph matching method is disclosed in U.S. Pat. No. 6,222,939 which describes a number of nodes each having a feature value. For comparing with a graph model, it is required to calculate feature values of an image. Although not all pixels are required to calculate, a great number of node locations are required to fetch. In this patent, a two dimensional searching on the image is essential. Also, the feature values for describing the face image are obtained by a complex two-dimensional calculation. Thus, a number of complex calculations and comparisons are required in each process of face landmarks location of an image. This bears a great burden upon the computer system, resulting in a significant decrease of efficiency.

Therefore, it is desirable to provide a novel method for locating face landmarks in an image to mitigate and/or obviate the aforementioned problems.

SUMMARY OF THE INVENTION

An object of the present invention is to provide a method for locating face landmarks in an image. The invention employs a one dimensional operation twice instead of a searching on a two dimensional matrix so as to reduce the number of operations, increase the image recognition accuracy, efficiently find face landmarks of an input image by comparison, and reduce system load.

Another object of the present invention is to provide a method for locating face landmarks in an image wherein a correspondence between a reference image and an input image is obtained by comparison without utilizing a heuristic approach. Thus, the invention is highly efficient in practice.

To achieve the object, the method for locating face landmarks in an image of the present invention comprises the steps of: (a) locating a face region in the input image by means of skin color; (b) finding, from the face region, a plurality of feature regions having different colors from the skin color, so as to align the input image according to the feature regions thereby obtaining an aligned input image; (c) comparing the aligned input image with a reference image labeled with face landmarks by performing a plurality of comparisons between pixel rows $R_i$ (i=1, 2, 3, ..., m) of the reference image and pixel rows $T_u$ (u=1, 2, 3, ..., p) of the aligned input image for obtaining m×p distances $d(R_i, T_u)$; and (d) in a first matrix formed of nodes (i,u) (i=1, 2, 3, ..., m; and u=1, 2, 3, ..., p), associating each node (i,u) with one of the distances $d(R_i, T_u)$, and in a path from a starting point (1, 1) to an ending point (p, m) of the first matrix, finding a minimum accumulated value of the distances $d(R_i, T_u)$ as a first optimal path, so as to obtain a correspondence between all pixel rows $R_i$ of the reference image and all pixel rows $T_u$ of the input image, thereby using the correspondence and the face landmarks of the reference image to find face landmarks of the aligned input image.

Other objects, advantages, and novel features of the invention will become more apparent from the detailed description when taken in conjunction with the accompanying drawings.

DETAILED DESCRIPTION OF THE PREFERRED EMBODIMENT

Figure 1:
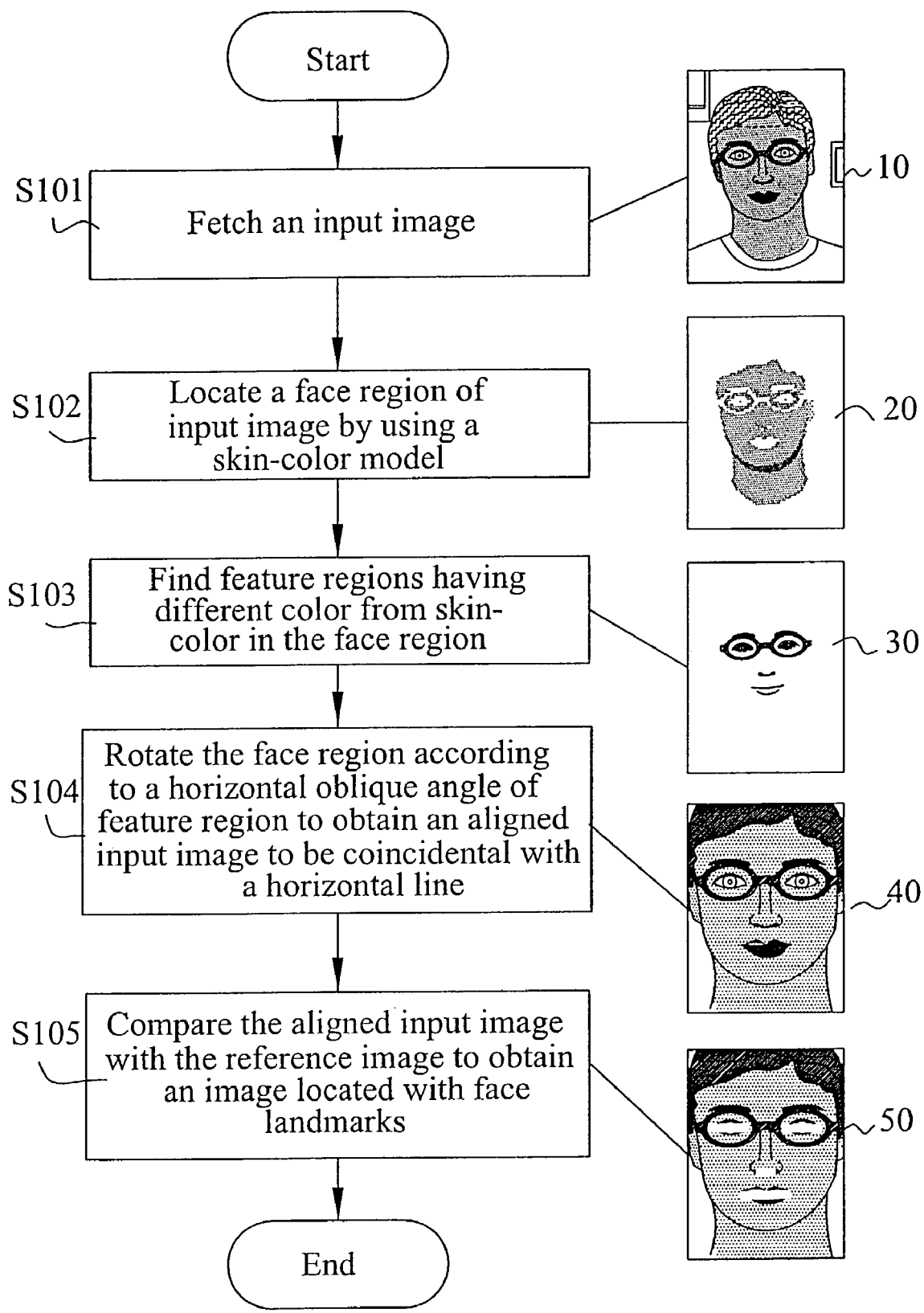
FIG. 1 is a flow chart illustrating a process of locating face landmarks in an image according to the invention.

With reference to FIG. 1, there is shown a flow chart illustrating a process of locating face landmarks in an image in accordance with the invention. An image-processing device fetches an input image 10 from a pictured object (e.g., human face) (step S101). It is found that portions other than the face such as clothes, furniture, background color, and etc. contained in the input image 10 may interfere with a face recognition performed by the image-processing device. Hence, a mean-shift algorithm is adopted by the embodiment. Further, a skin color model is employed to perform a color segment on the input image 10. As a result, background color is eliminated by performing analysis and matching operations on the skin color model. Therefore, a face region 20 having a color similar with the skin color shown in the input image 10 is obtained (step S102).

Since the face region 20 may be oblique, an alignment of the input image 10 is required to make the face region 20 straight. At this time, a feature region 30 having a different skin color from that of the face region 20 has to be located therein (step S103). It is known that there are a number of symmetric portions on the face region 20 such as eyes and eyebrows, which are distinct in color from other portions of the face. Therefore, a non-skin color model is employed to locate the feature region 30 of the face region 20, which may be of eyes or eyebrows. Moreover, a pair of symmetric regions is found from the feature region 30. A horizontal oblique angle is measured from a straight line between centers of the symmetric regions relative to a horizontal line. The face region 20 is thus rotated by the horizontal oblique angle to be coincidental with the horizontal line, thereby obtaining an aligned input image 40 (step S104). Finally, the aligned input image 40 is compared with a reference image marked in gray level and located with face landmarks for finding a correspondence therebetween, thereby obtaining an image 50 with located face landmarks (step S105). A detail of the comparison step of S105 will be described hereinafter. Furthermore, the face landmarks described can be eyes, eyebrows, nose, lips, cheeks, forehead, etc.

Figure 2:
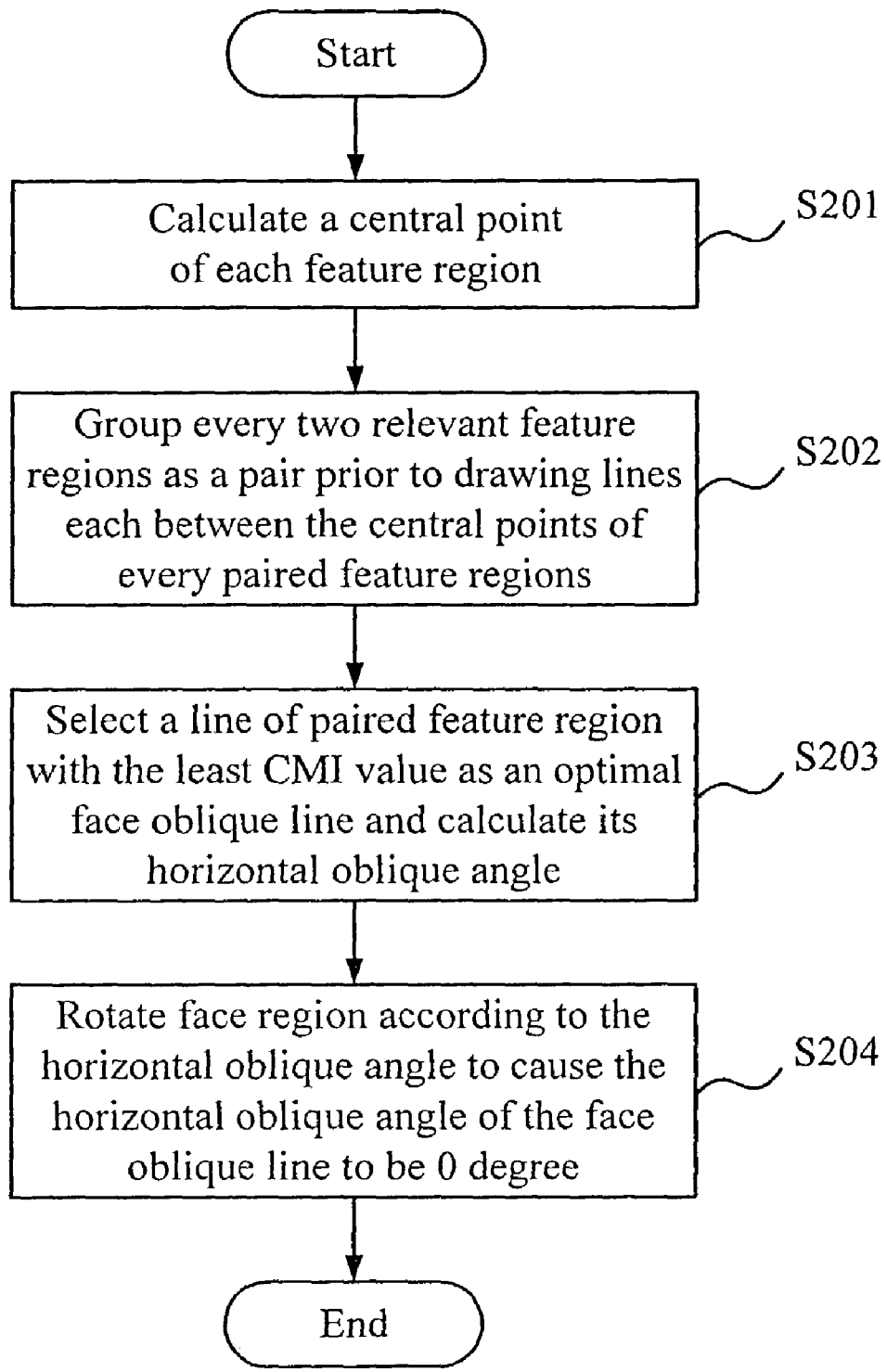
FIG. 2 is a flow chart illustrating a process of aligning a face region according to the invention.
Figure 3A:
FIG. 3A is a schematic plan view showing a face oblique line in an image.
Figure 3B:
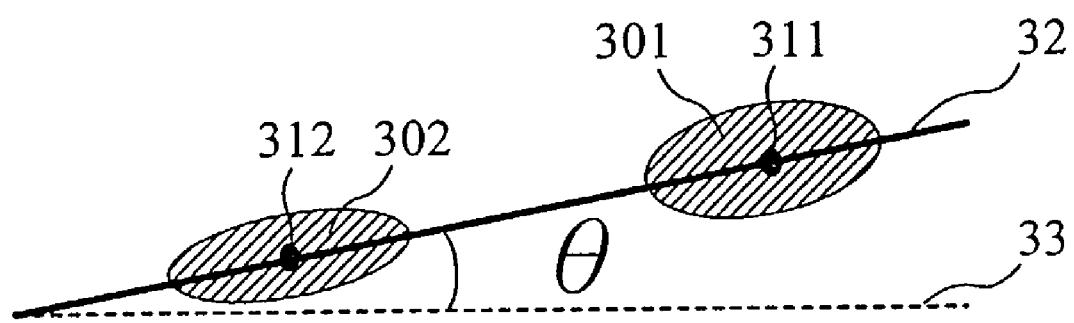
FIG. 3B is an enlarged fragmentary view of FIG. 3A.

With reference to FIG. 2 in conjunction with FIGS. 3A and 3B, there is shown a flow chart illustrating a process of aligning the face region 20 according to the invention. As seen from FIG. 3A, the feature region 30 fetched from the non-skin model is interfered by a personal article (e.g., a pair of eyeglasses) or shaded region. As a result, an extra region in addition to eyes and eyebrows is generated. Therefore, a central point of each feature region 30 is firstly calculated prior to aligning the face region 20 (step S201). Next, two relevant feature regions 30 are grouped as a pair prior to forming a line between central points of every two feature regions 30 (step S202). As a result, a plurality of oblique lines are obtained. Note that only one line 32 from a central point of one eyebrow to that of the other eyebrow is shown in FIG. 3A. It is known that eyes or eyebrows of a person are symmetric. Hence, it is possible of finding a most similar shape from the matched feature regions 30 based on the symmetric features and a possible oblique degree of the face. As a result, both an optimal face oblique line 32 describing the oblique face and an optimal horizontal oblique angle θ of the face relative to a horizontal line 33 are obtained (step S203).

As shown in FIG. 3B, which gives a partially enlarged view of the FIG. 3A, the image-processing device fetches feature regions 301, 302 for calculating central points 311, 312. Furthermore, the oblique line 32 from one central point 311 to the other one 312 is drawn, thereby obtaining an oblique angle θ of the face (i.e., the oblique line 32) relative to the horizontal line 33. Hence, a central moment of inertia (CMI) of the line 32 plotted on X-Y coordinate for each feature region 301, 302 may be expressed as:

$$\sum_y \sum_x [(x-\bar{x})\sin\theta - (y-\bar{y})\cos\theta]^2,$$

where (x,y) is a pixel location in the feature region and ($\bar{x}$, $\bar{y}$) is a central point of the feature region. Thus, CMI represents a shape of each feature region. In this regard, a difference between CMIs of the feature regions 301, 302 means a difference of the shapes of the feature regions 301, 302.

Moreover, a minimum difference between CMIs is taken as the optimal face oblique line described in step S203. In the embodiment as shown in FIG. 3B, the oblique line 32 passing the central points of the feature regions is the optimal face oblique line 32 which has the minimum CMI. Consequently, the horizontal oblique angle θ is obtained. Next, by rotating the horizontal oblique angle θ clockwise, the face region 20 (i.e., the oblique line 32) is caused to be coincidental with the horizontal line 33; i.e., the oblique angle θ is reduced to zero (step S204). As a result, an aligned input image 40 is obtained in which the line passing eyes of eyebrows is substantially coincidental with the horizontal line as shown in FIG. 1. Note that in step S202 of the face region 20 alignment process, it is possible that an excess of lines are drawn due to too many fetched feature regions 30. This can undesirably increase a load upon system. Hence, preferably only an oblique line less than or equal to a predetermined oblique angle of the face is maintained without calculating and comparing all matched CMIs.

Figure 4A:
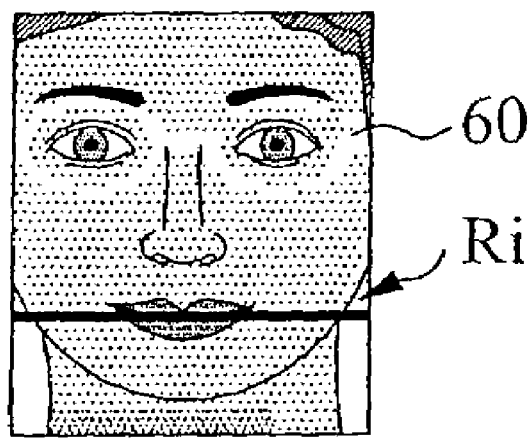
FIG. 4A shows a reference image graph according to the invention.
Figure 4B:
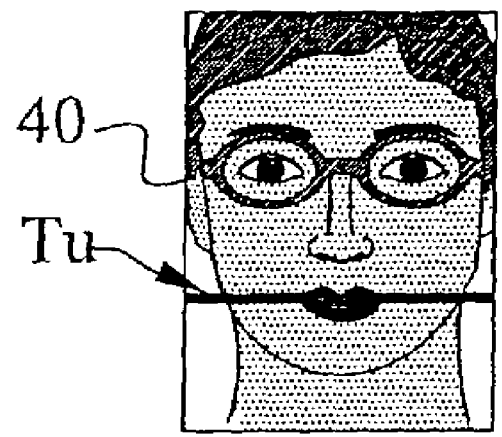
FIG. 4B shows an input image graph according to the invention.

With reference to FIGS. 4A and 4B, a comparison process depicted in step S105 is further illustrated. As stated above, the input image 10 (FIG. 1) can be converted into the aligned input image 40 (FIG. 4B) based on the steps S101 to S104. For finding the face landmarks, a locating technique is employed by taking a reference image 60 as a basis. Information about location of the face landmarks is already stored in the reference image 60. Thus, it is sufficient to find corresponding locations of the face landmarks of the aligned input image 40 and the reference image 60.

Figure 5:
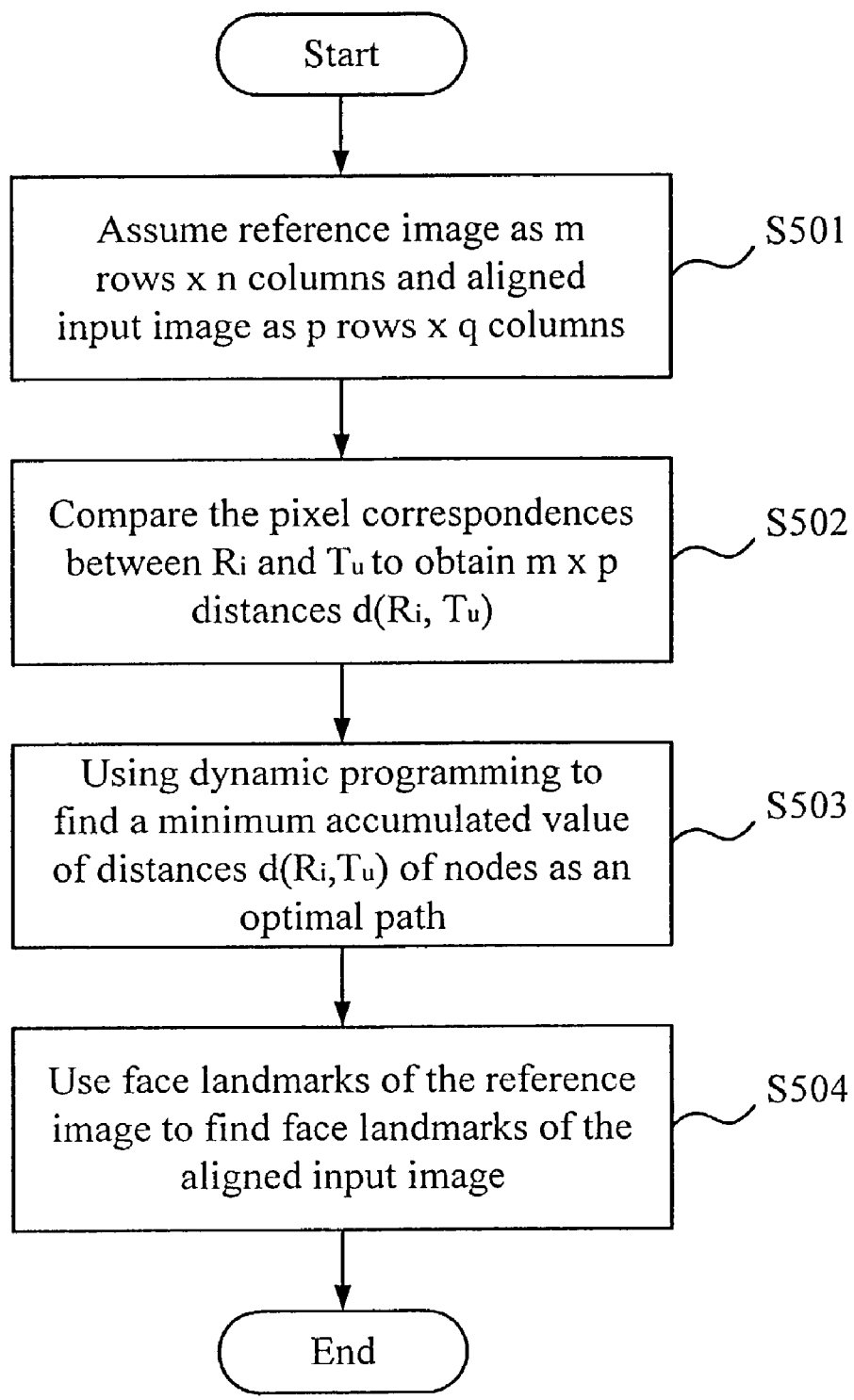
FIG. 5 is a flow chart illustrating a process of comparing the reference image graph with the aligned input image graph for obtaining an image with located face landmarks.
Figure 6:
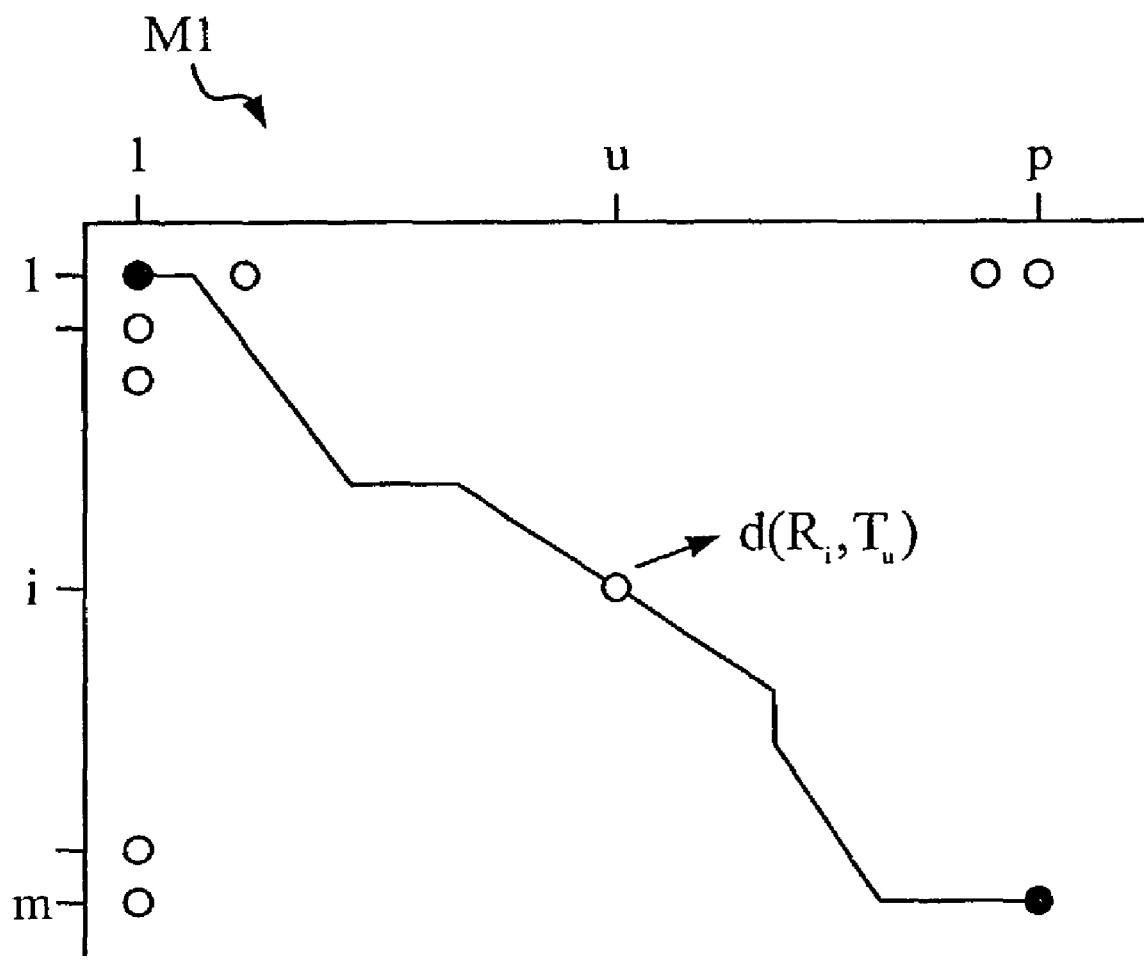
FIG. 6 is a plot of a first matrix according to the invention.

With reference to FIG. 5 in conjunction with FIG. 6, there is shown a flow chart illustrating a process of finding face landmarks. Firstly, it is assumed that the reference image 60 has a dimension of m rows by n columns and the aligned input image 40 has a dimension of p rows by q columns (step S501). $R_i$ represents a pixel row of the reference image 60, where i=1, 2, 3, . . . , m. $T_u$ represents a pixel row of the aligned input image 40, where u=1, 2, 3, . . . , p. By comparing $R_i$ and $T_u$, m×p distances $d(R_i, T_u)$ are obtained (step S502). As shown in FIG. 6. in a first matrix M1 formed of nodes (i,u) (i=1, 2, 3, . . . , m; and u=1, 2, 3, . . . , p), each node (i,u) is associated with a distance $d(R_i, T_u)$. The smaller of $d(R_i, T_u)$ is, the closer of two nodes are. In a path from starting point (1, 1) to ending point (p, m) of the first matrix M1, dynamic programming is utilized to find a minimum accumulated value of distances $d(R_i, T_u)$ of nodes taken as an optimal path (step S503), so as to obtain a correspondence between all pixel rows $R_i$ of the reference image 60 and all pixel rows $T_u$ of the aligned input image 40. The correspondence together with locations of the face landmarks of the reference image 60 are used to find corresponding face landmarks of the aligned input image 40 (step S504). As a result, an image 50 with located face landmarks is obtained as shown in FIG. 1.

Figure 7:
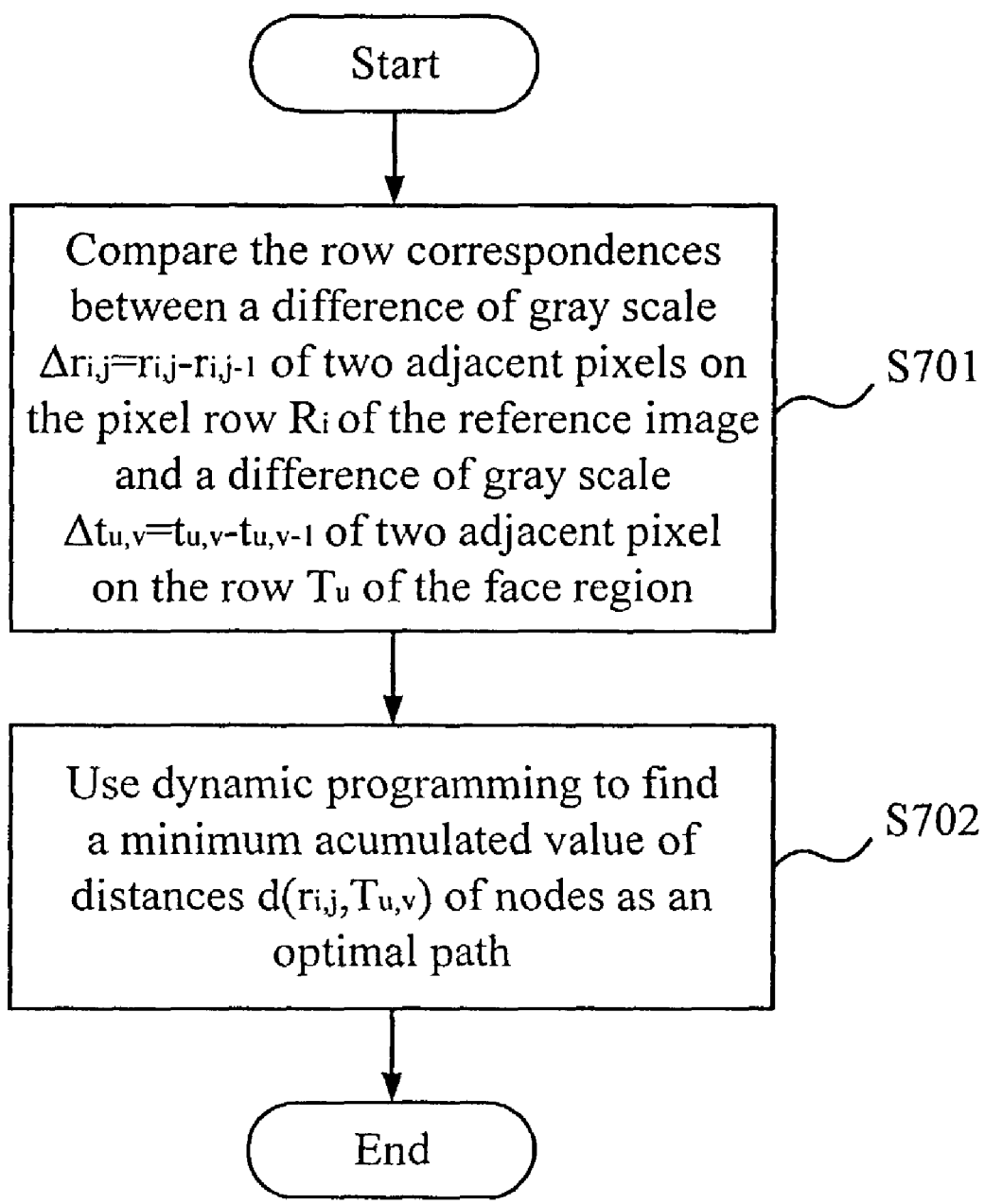
FIG. 7 is a flow chart illustrating a process of calculating a distance $d(R_i, T_u)$ according to the invention.
Figure 8:
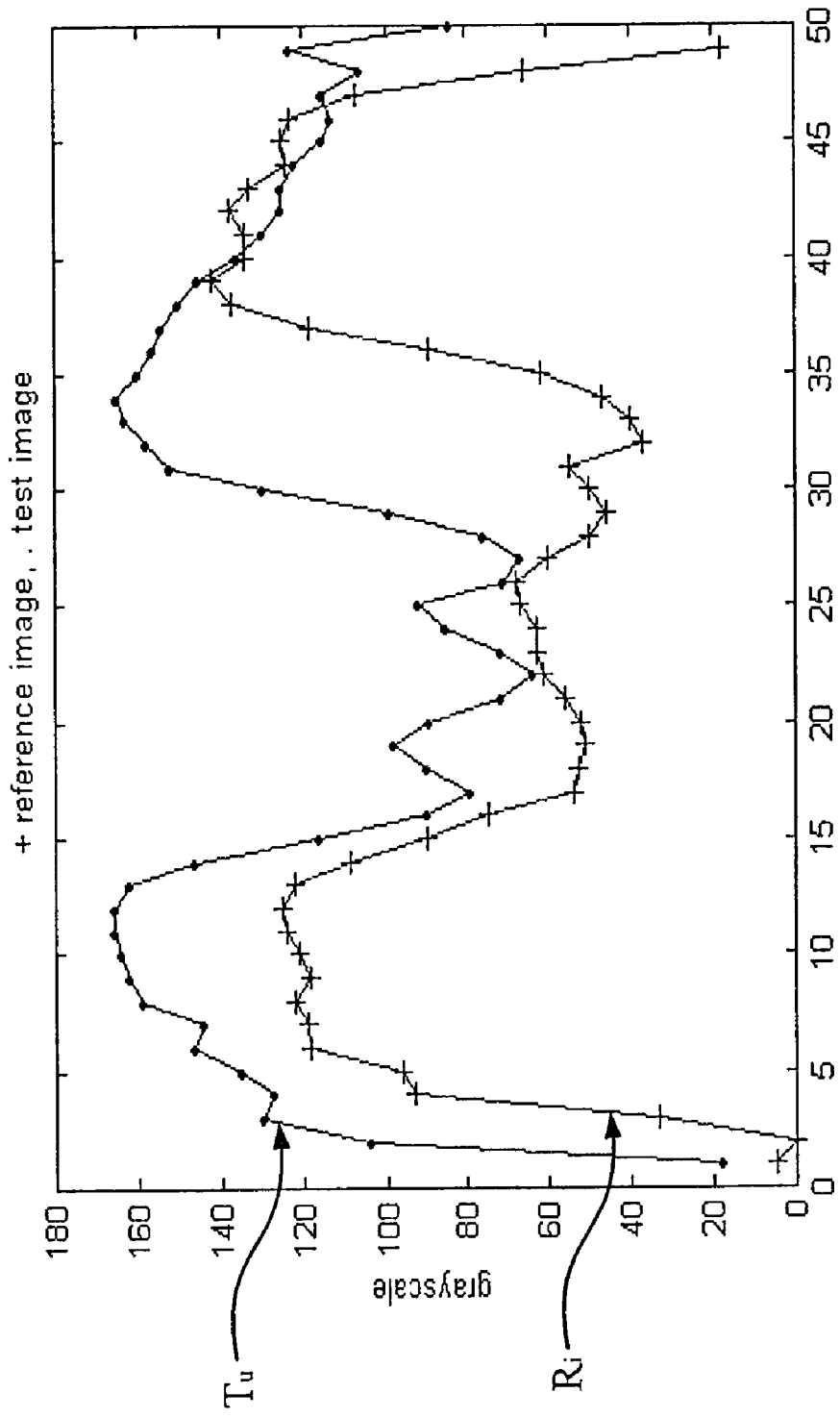
FIG. 8 shows the pixels of the reference image $R_i$ and the input image $T_u$ versus gray level.
Figure 9:
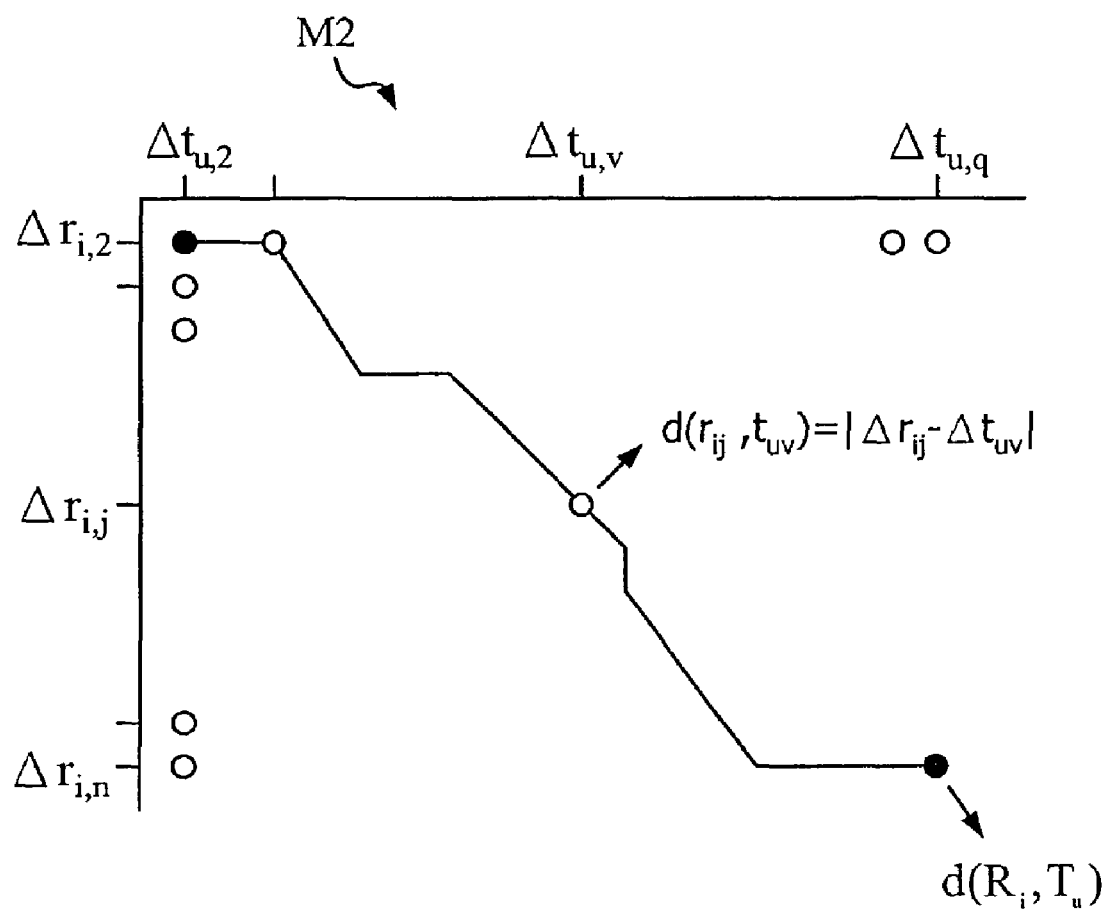
FIG. 9 is a plot of a second matrix according to the invention.

With reference to FIG. 7 in conjunction with FIGS. 8 and 9, a detailed process of calculating each distance $d(R_i, T_u)$ depicted in step S503 is illustrated. For calculating a distance $d(R_i, T_u)$ between two pixel rows, it is required to compare pixels between the same. As shown in FIG. 8, a graph of pixels of $R_i$ (obtained in FIG. 4A) and $T_u$ (obtained in FIG. 4B) passing through centers of lips versus gray level is plotted. It is seen that each pixel has a corresponding distinct gray level. For the reference image 60, each pixel row $R_i$ has a number n of pixels and a gray level $r_{i,j}$, where j=1, 2, 3, . . . , n. Furthermore, for the aligned input image 40, each pixel row $T_u$ has a number q of pixels and a gray level $t_{u,v}$, where v=1, 2, 3, . . . , q.

First, it is to compare the row correspondences between a difference of gray level $\Delta r_{i,j} = r_{i,j} - r_{i,j-1}$, of two adjacent pixels on the pixel row $R_i$ of the reference image 60 and a difference of gray level $\Delta t_{u,v} = t_{u,v} - t_{u,v-1}$ of two adjacent pixel on the row $T_u$ of the face region 20 (step S701). As a result, a number $(n-1) \times (q-1)$ of distances $d(r_{i,j}, t_{u,v}) = |\Delta r_{i,j} - \Delta t_{u,v}|$ are obtained, w $r_{i,j}$ (j=1, 2, 3, . . . , n) represents a gray level of pixels of pixel row $R_i$, and $t_{u,v}$ (v=1, 2, 3, . . . , q) represents a gray level of pixels of pixel row $T_u$. Likewise, as shown in FIG. 9, in a second matrix M2 formed of nodes ($\Delta r_{i,j}$, $\Delta t_{u,v}$)(j=1, 2, 3 . . . n, and v=1,2,3 . . . q), each node ($\Delta r_{i,j}$, $\Delta t_{u,v}$) is associated with a distance $d(R_{i,j}, T_{u,v})$. In a path from starting point ($\Delta r_{i,2}$, $\Delta t_{u,2}$) to ending point ($\Delta r_{i,n}$, $\Delta t_{u,q}$) of the second matrix M2, the dynamic programming is also utilized to find a minimum accumulated value of distances $d(R_{i,j}, T_{u,v})$ of nodes taken as an optimal path (step S702). Furthermore, a correspondence between pixels is obtained in which a minimum accumulated value is taken as a distance $d(R_i, T_u)$ of pixel rows $R_i$ and $T_u$.

In view of the foregoing, it is found that two comparisons are performed between the reference image 60 and the aligned input image 40. First, there is found an optimal correspondence between pixels from all pixel rows, i.e., the second matrix M2 shown in FIG. 9. Next, there is found an optimal correspondence between pixel rows from all pairs, i.e., the first matrix M1 shown in FIG. 6. For finding a corresponding location of one pixel of the reference image 60 in the aligned input image 40, first, it is to find an optimal corresponding pixel row in the aligned input image 40 based on a result of the first matrix M1 started from the location of the pixel row. Next, it is to find a pixel corresponding to the optimal pixel row from a result of the second matrix M2.

Thus, the invention employs a one-dimensional operation twice instead of a searching on a two dimensional matrix. Furthermore, a simple difference of gray level in an image is taken as the face landmarks. This has the benefits of quick and simple operation, more efficiency in an image recognition process, and a fast finding in an image having located face landmarks from the input image.

Although the present invention has been explained in relation to its preferred embodiment, it is to be understood that many other possible modifications and variations can be made without departing from the spirit and scope of the invention as hereinafter claimed.

What is claimed is:

1. A method for locating face landmarks in an input image comprising the steps of:
   (a) locating a face region in the input image by means of skin color;
   (b) finding, from the face region, a plurality of feature regions having different colors from the skin color, so as to align the input image according to the feature regions thereby obtaining an aligned input image;
   (c) comparing the aligned input image with a reference image located with face landmarks by performing a plurality of comparisons between pixel rows $R_i$ (i=1, 2, 3, . . . , m) of the reference image and pixel rows $T_u$ (u=1, 2, 3, . . . , p) of the aligned input image for obtaining m×p distances $d(R_i, T_u)$; and
   (d) in a first matrix formed of nodes (i,u) (i=1, 2, 3, . . . , m; and u=1, 2, 3, . . . , p), associating each node (i,u) with one of the distances $d(R_i, T_u)$, and in a path from a starting point (1, 1) to an ending point (p, m) of the first matrix, finding a minimum accumulated value of the distances $d(R_i, T_u)$ as a first optimal path, so as to obtain a correspondence between all pixel rows $R_i$ of the reference image and all pixel rows $T_u$ of the input image, thereby using the correspondence and the face landmarks of the reference image to find face landmarks of the aligned input image.

2. The method as claimed in claim 1, wherein in the step (c) each distance $d(R_i, T_u)$ is obtained by performing the steps of:
   (c1) comparing the row correspondences between a difference of gray level $\Delta r_{i,j} = r_{i,j} - r_{i,j-1}$, of two adjacent pixels on the pixel row $R_i$ of the reference image and a difference of gray level $\Delta t_{u,v} = t_{u,v} - t_{u,v-1}$ of two adjacent pixel on the row $T_u$ of the face region, and obtaining $(n-1) \times (q-1)$ distances $d(r_{i,j}, t_{u,v}) = |\Delta r_{i,j} - \Delta t_{u,v}|$, where $r_{i,j}$ (j=1, 2, 3, . . . , n) represents the gray level value of the pixels of the pixel row $R_i$, and $t_{u,v}$ (v=1, 2, 3, . . . , q) represents the gray level value of the pixels of the pixel row $T_u$; and
   (c2) in a second matrix formed of nodes ($\Delta r_{i,j}$, $\Delta t_{u,v}$) (j=1, 2, 3 . . . n, and v=1, 2, 3 . . . q), associating each node ($\Delta r_{i,j}$, $\Delta t_{u,v}$) with the distance $d(r_{i,j}, t_{u,v})$ and in a path from a starting point ($\Delta r_{i,2}$, $\Delta t_{u,2}$) to an ending point ($\Delta r_{i,n}$, $\Delta t_{u,q}$) of the second matrix, finding a minimum accumulated value of the distances $d(r_{i,j}, t_{u,v})$ of the nodes ($\Delta_{r,j}$, $\Delta t_{u,v}$) as a second optimal path, wherein the minimum accumulated value of the distances $d(r_{i,j}, t_{u,v})$ of the nodes ($\Delta r_{i,j}$, $\Delta t_{u,v}$) is defined as the distance $d(R_i, T_u)$ of the pixel rows $R_i$ and $T_u$.

3. The method as claimed in claim 2, wherein in the step (c2) a dynamic programming is used to find the second optimal path.

4. The method as claimed in claim 1, wherein in the step (a), a skin color model is employed to perform a color segment on the input image for finding the face region thereof.

5. The method as claimed in claim 4, wherein in the step (a), a mean-shift algorithm is employed to perform a color segment on the input image.

6. The method as claimed in claim 1, wherein the step (b) further comprises the steps of:
   (b1) determining a central point of each feature region;
   (b2) grouping every two relevant feature regions as a pair, and drawing a plurality of lines, each between the central points of every paired feature regions;
   (b3) finding an optimal face oblique line from the lines describing the oblique face region and a horizontal oblique angle of the face region relative to a horizontal line, wherein the optimal face oblique line has a minimum difference between every two of a plurality of central moments of inertia (CMIs); and (b4) rotating the face region according to the horizontal oblique angle to cause the horizontal oblique angle of the face oblique line to be 0 degree to obtain an aligned input image.

7. The method as claimed in claim 6, wherein in the step (b2), only one of the lines less than or equal to a predetermined oblique angle of the face region is drawn.

8. The method as claimed in claim 1, wherein in the step (b), a non-skin color model is employed to find, from the face region, the feature regions having colors different from skin color.

9. The method as claimed in claim 1, wherein the size of the face region is adjusted to be equal to that of the reference image.

10. The method as claimed in claim 1, wherein the face landmarks comprise eyes, eyebrows, nose, lips, cheeks, and forehead.

11. The method as claimed in claim 1, wherein in the step (d), the first optimal path is determined by dynamic programming.

* * * * *